(12) United States Patent
Gillner et al.

(10) Patent No.: US 11,904,362 B2
(45) Date of Patent: Feb. 20, 2024

(54) METHOD AND DEVICE FOR ANALYSING AND/OR SORTING SCRAP METAL

(71) Applicant: HYDRO ALUMINIUM RECYCLING DEUTSCHLAND GMBH, Dormagen (DE)

(72) Inventors: Ronald Gillner, Swisttal (DE); Nils Robert Bauerschlag, Aachen (DE)

(73) Assignee: Hydro Aluminium Recycling Deutschland GmbH, Dormagen (DE)

( * ) Notice: Subject to any disclaimer, the term of this patent is extended or adjusted under 35 U.S.C. 154(b) by 0 days.

(21) Appl. No.: 17/778,180

(22) PCT Filed: Nov. 20, 2020

(86) PCT No.: PCT/EP2020/082843
§ 371 (c)(1),
(2) Date: May 19, 2022

(87) PCT Pub. No.: WO2021/099549
PCT Pub. Date: May 27, 2021

(65) Prior Publication Data
US 2022/0410216 A1    Dec. 29, 2022

(30) Foreign Application Priority Data
Nov. 21, 2019  (DE) ..................... 10 2019 131 551.4

(51) Int. Cl.
*B07C 5/346*  (2006.01)
*B07C 5/36*   (2006.01)
*G01N 23/222* (2006.01)

(52) U.S. Cl.
CPC ............... *B07C 5/346* (2013.01); *B07C 5/36* (2013.01); *G01N 23/222* (2013.01); *B07C 2501/0054* (2013.01); *G01N 2223/643* (2013.01)

(58) Field of Classification Search
CPC ... B07C 5/346; B07C 5/36; B07C 2501/0054; G01N 23/222
(Continued)

(56) References Cited

U.S. PATENT DOCUMENTS 10,486,209 B2 * 11/2019 Wimmer .............. G01N 21/718
11,358,179 B2 *  6/2022 Havenith ................ B07C 5/346
(Continued)

FOREIGN PATENT DOCUMENTS

EP    3318339 A1    5/2018
EP    3393687 B1    9/2019

*Primary Examiner* — Michael McCullough
*Assistant Examiner* — Jessica L Burkman
(74) *Attorney, Agent, or Firm* — Harness, Dickey & Pierce, P.L.C.

(57) ABSTRACT

The disclosure relates to a method for the analysis and/or sorting of scrap metal, more particularly of scrap aluminium, in which a quantity of scrap metal, more particularly aluminium scrap, in the form of a scrap bundle or a group of scrap bundles is provided, in which method the scrap bundle or the group of scrap bundles is irradiated by at least one neutron source, the gamma radiation emitted by the scrap bundle or by the group of scrap bundles is captured by at least one detector, and composition information relating to the composition of the scrap bundle or the group of scrap bundles is determined on the basis of the gamma radiation captured by the at least one detector. The disclosure further relates to a device for analysing and/or sorting scrap metal.

9 Claims, 3 Drawing Sheets

Figure 1:
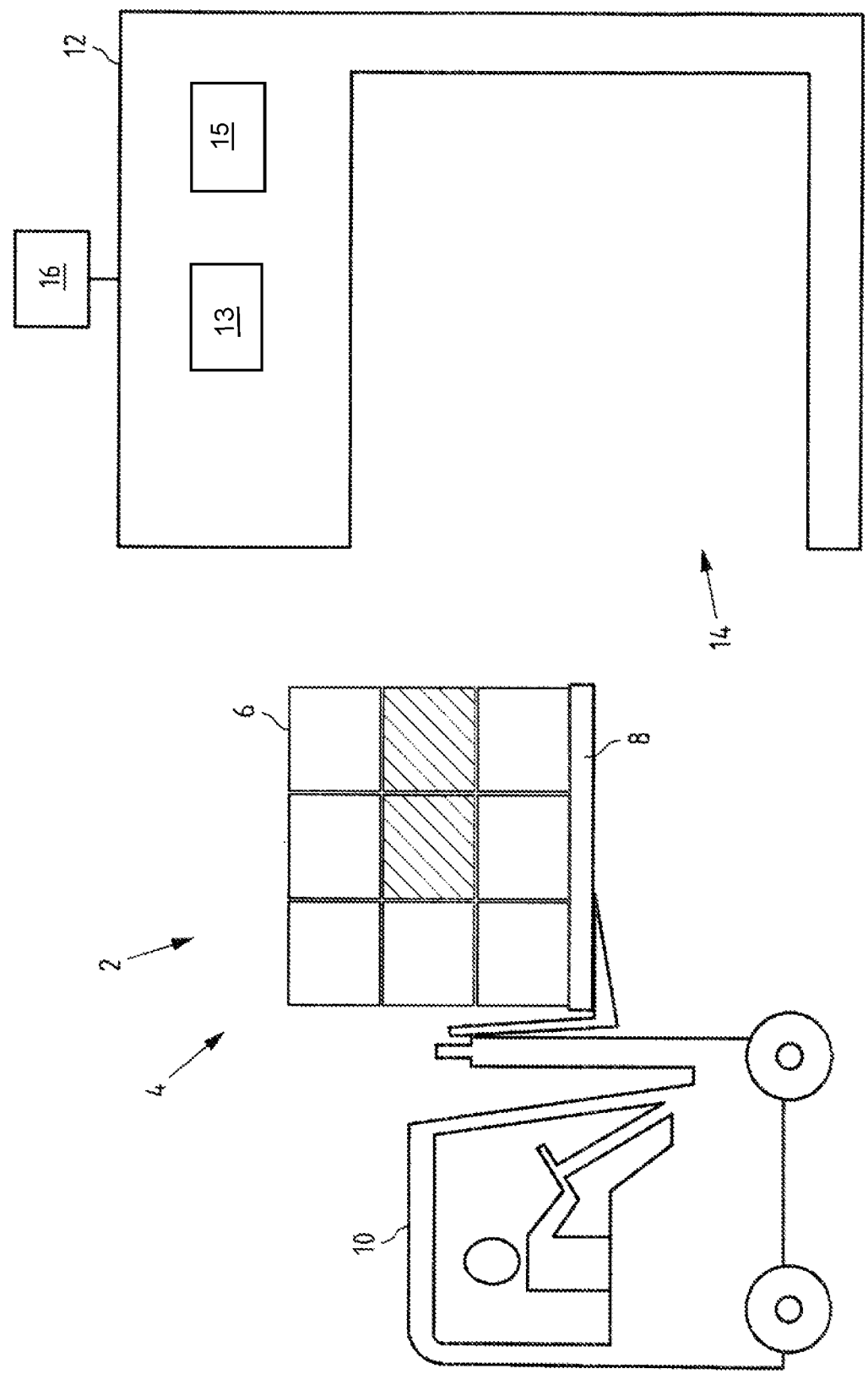

(58) Field of Classification Search
USPC .......................................................... 209/859
See application file for complete search history.

(56) References Cited

U.S. PATENT DOCUMENTS

2009/0236268 A1* 9/2009 Shulman ................. B07C 5/344
209/636
2018/0297091 A1 10/2018 Wimmer et al.
2021/0001376 A1 1/2021 Havenith et al.

* cited by examiner

METHOD AND DEVICE FOR ANALYSING AND/OR SORTING SCRAP METAL

CROSS-REFERENCE TO RELATED APPLICATIONS

This application is a U.S. National Phase Application under 35 U.S.C. 371 of International Application No. PCT/EP2020/082843 filed on Nov. 20, 2020, which claims the benefit of German Patent Application No. 10 2019 131 551.4, filed on Nov. 21, 2019. The entire disclosures of the above applications are incorporated herein by reference.

FIELD

The disclosure relates to a method and device for analysing and/or sorting scrap metal, more particularly scrap aluminium.

BACKGROUND

This section provides background information related to the present disclosure which is not necessarily prior art.

To reduce the cost of aluminium alloy production and to increase the recycling rate, there is a need to use as much scrap aluminium as possible to feed an aluminium melting furnace.

Scrap aluminium is typically delivered by scrap dealers in the form of compressed scrap bundles. To determine and/or check the composition of these scrap bundles, small samples are melted down and chemically analysed in practice. However, this analysis is quite time-consuming and the composition of the sample may differ significantly from the actual composition of the entire scrap bundle or a delivery of several scrap bundles, for example, if impurities such as foreign metals or even non-metallic impurities are contained in the scrap bundles or if a scrap bundle contains scrap fragments of different aluminium alloys.

Although it would be possible to separate the scrap bundles and analyse the scrap fragments they contain individually, this would be quite costly.

In view of this, the disclosure is based on the problem of providing a method and a device for analysing and/or sorting and/or evaluating scrap metal with which more reliable information about the composition of the scrap fragments can be obtained with quite little effort.

SUMMARY

This section provides a general summary of the disclosure, and is not a comprehensive disclosure of its full scope or all of its features.

This problem is solved according to the disclosure by a method for the analysis and/or sorting of scrap metal, more particularly of scrap aluminium, in which a quantity of scrap metal, more particularly scrap aluminium, in the form of a scrap bundle or a group of scrap bundles is provided, in which method the scrap bundle or the group of scrap bundles is irradiated by at least one neutron source, the gamma radiation emitted by the scrap bundle or by the group of scrap bundles is captured by at least one detector, and composition information relating to the composition of the scrap bundle or the group of scrap bundles is determined on the basis of the gamma radiation captured by the at least one detector.

It was recognized that by means of a neutron activation analysis (NAA) or, more specifically, a prompt gamma neutron activation analysis (PGNAA), it is possible not only to determine the composition of individual or a few scrap fragments, but also to perform a compositional analysis of an entire scrap bundle or even a group of scrap bundles in their entirety. In this way, a scrap bundle or a group of scrap bundles can be completely analysed in one measuring process so that reliable composition information about the composition of the scrap bundle or the group of scrap bundles can be obtained with little effort.

The method can be used to analyse the composition of a single scrap bundle or also of a group of scrap bundles. A group of scrap bundles can be provided in particular as a loose stack of scrap bundles or also as a pack of several scrap bundles, for example several scrap bundles stacked on a pallet.

A scrap bundle is understood to mean in particular a quantity of scrap fragments, in particular scrap aluminium fragments, which are pressed together to form a bundle. Such scrap bundles may contain scrap fragments of different alloys, in particular aluminium alloys, and/or impurities, for example foreign metal impurities or non-metallic impurities (e.g. plastic).

The scrap bundle or bundles may be in particular cuboid-shaped. The scrap bundle or bundles have in particular an extension in the three spatial directions, in particular edge lengths, of at least 20 cm each. Preferably, the scrap bundles have edge lengths in the range 30-150 cm, in particular 40-60 cm.

According to the disclosure, the above-mentioned problem is further solved by a method for analysing and/or sorting scrap metal, in particular scrap aluminium, in particular corresponding to the method described above, in which a plurality of scrap bundles and/or a plurality of groups of scrap bundles are provided and in which respective composition information is determined for the scrap bundles and/or the groups of scrap bundles in that the respective scrap bundle or the respective group of scrap bundles is irradiated by at least one neutron source, the gamma radiation emitted by the respective scrap bundle or the respective group of scrap bundles is captured by at least one detector, and composition information about the composition of the respective scrap bundle or the respective group of scrap bundles is determined on the basis of the captured gamma radiation.

In this way, composition information can be determined reliably and with relatively little effort for several scrap bundles and/or groups of scrap bundles so that the scrap bundles or groups of scrap bundles can be checked, sorted or used more selectively for melting.

In the following, various embodiments for the previously described methods are described, wherein the individual embodiments apply equally to both methods. Furthermore, the embodiments can be combined with each other.

In one embodiment, the group of scrap bundles is provided as a loose stack or a pack of scrap bundles, for example as a pallet with scrap bundles. In particular, a stack or a pack, e.g. an entire pallet comprising a plurality of scrap bundles, may be simultaneously positioned in the region of the at least one neutron source and the at least one detector, such that composition information is obtained for all of the scrap in the stack or pack of scrap bundles.

In a further embodiment, a value for the weight of the scrap bundle or group of scrap bundles is determined, in particular measured. When analysing a plurality of scrap bundles and/or a plurality of groups of scrap bundles, the respective weight of the scrap bundles and/or the groups of scrap bundles is preferably measured. The one or more measurements may be made, for example, by means of a belt weigher. By measuring the weight, information about the absolute contents of certain alloying elements in a scrap bundle and/or a group of scrap bundles can be determined. This information allows a more targeted further use of the scrap bundles. Therefore, the composition information is preferably also determined depending on the determined value for the weight.

In a further embodiment, the composition information comprises a value for the content of at least one element, preferably values for the respective content of several elements. The elements may be classical alloying elements (e.g. Al, Fe, Si, Mg, Mn, Zn, etc. for aluminium alloys) and/or also elements of typical impurities (e.g. C, F, Cl, for aluminium alloys). The value for the content can be given, for example, as a percentage by weight (e.g. 1.5 wt. %), in particular of the total weight of the scrap bundle or group of scrap bundles, or also as a weight (e.g. 15 kg) if the total weight of the scrap bundle or group of scrap bundles has been determined.

The composition information may additionally or alternatively also contain one or more values of parameters based on the contents of one or more elements.

In a further embodiment, the composition information is assigned to the scrap bundle or group of scrap bundles. For this purpose, the composition information may in particular be assigned to an identifier assigned to the scrap bundle or group of scrap bundles. If several scrap bundles and/or groups of scrap bundles are analysed one after the other in a sequence, the scrap bundles and/or groups of scrap bundles can, for example, be assigned a respective identifier depending on the sequence. The scrap bundles and/or groups of scrap bundles can also be assigned respective identifiers by means of attached labels.

In a further embodiment, the scrap bundle or group of scrap bundles is assigned to one of several predetermined classes depending on the determined composition information and a predetermined assignment rule. In particular, respective content limits for one or more elements, in particular alloying elements, may be defined for the classes. The assignment rule may in particular comprise a comparison of the determined composition information with the content limits defined for the classes. For example, a class for AA 5xxx alloys and a class for AA 6xxx alloys may be defined, wherein the class for AA 5xxx alloys is only assigned to scrap bundles whose composition information is within the content limits defined for the AA 5xxx class.

In a further embodiment, the scrap bundle or group of scrap bundles is sorted depending on the determined composition information. If a respective composition information is determined for several scrap bundles and/or groups of scrap bundles, the scrap bundles and/or groups of scrap bundles are preferably sorted depending on the respective determined composition information. In this way, sorting is achieved depending on the overall composition of the scrap bundles or group of scrap bundles.

In a further embodiment, a plurality of scrap bundles and/or a plurality of groups of scrap bundles are provided, the scrap bundles and/or the groups of scrap bundles are placed on a conveyor system, and the scrap bundles and/or the groups of scrap bundles are conveyed with the conveyor system successively through a measuring device in which the scrap bundles and/or the groups of scrap bundles are irradiated by at least one neutron source, wherein the gamma radiation emitted by a respective one of the scrap bundles or by a respective group of scrap bundles is captured by at least one detector and composition information about the composition of the respective scrap bundle or the respective group of scrap bundles is determined on the basis of the captured gamma radiation. In this way, many scrap bundles or groups of scrap bundles can be analysed and/or sorted one after the other in a short time. In particular, the measuring device is arranged to analyse the scrap bundles and/or groups of scrap bundles in their entirety. For this purpose, the measuring device is in particular dimensioned accordingly large. The conveyor system preferably comprises one or more belt conveyor systems.

Each of the scrap bundles comprises in particular a respective quantity of scrap metal, more particularly scrap aluminium.

The composition information on the composition of the respective scrap bundle or the respective group of scrap bundles is preferably assigned to the respective scrap bundle or the respective group of scrap bundles, for example on the basis of a corresponding order number of a sequence in which the scrap bundles and/or groups of scrap bundles are conveyed through the measuring device.

The scrap bundles and/or the groups of scrap bundles can be sorted in particular depending on the respective determined and/or assigned composition information, for example by means of an automatic sorting device or by means of a crane or vehicle, for example a forklift. For example, several bunkers can be provided into which the scrap bundles and/or groups of scrap bundles are sorted depending on the respective determined and/or assigned composition information.

The scrap bundles and/or the groups of scrap bundles can in particular be placed on the conveyor system at a predetermined feeding point, for example by means of a crane or vehicle, for example a forklift. The feeding point is arranged in particular upstream of the measuring device in the conveying direction.

After leaving the measuring device, the scrap bundles and/or the groups of scrap bundles can be removed from the conveyor system, for example by means of a crane or vehicle, for example a forklift. The removal point is arranged in particular downstream of the measuring device in the conveying direction.

The area of the measuring device can be bounded, for example by a fence. In this way, persons can be protected from a possibly increased radiation exposure in the area of the measuring device. In this case, the feeding point and/or the removal point are preferably arranged outside the boundary, in particular outside the fence. In this way, safe loading or unloading of the scrap bundles or groups of scrap bundles is made possible.

The scrap bundles and/or the groups of scrap bundles are preferably weighed, for example by means of a belt weigher on the conveyor system. The weight of a respective one of the scrap bundles or a respective one of the groups of scrap bundles determined in this way can be assigned to the respective scrap bundle or the respective group of scrap bundles. Additionally or alternatively, an intended sorting of the scrap bundles and/or groups of scrap bundles can also be carried out depending on the respective determined weight.

According to the disclosure, the above-mentioned problem is further solved by a device for analysing and/or sorting scrap metal, in particular scrap aluminium, the device comprising a conveyor system for conveying scrap bundles, a measuring device which has at least one neutron source for irradiating scrap bundles conveyed on the conveyor system, and at least one detector for capturing the gamma radiation emitted by the scrap bundles as a result of this neutron irradiation, and a computation device which is arranged to determine composition information about the composition of one or more scrap bundles conveyed on the conveyor system on the basis of the gamma radiation captured by the at least one detector.

In particular, the measuring device is set up to analyse entire scrap bundles or groups of scrap bundles in their entirety.

The device described above or one of the embodiments thereof described below is preferably used for analysing and/or sorting scrap metal, in particular scrap aluminium, in particular in one of the methods described above or an embodiment thereof.

In one embodiment of the apparatus, the conveyor system comprises one or more belt conveyors. In this way, the scrap bundles can be transported in particular through the measuring device.

In a further embodiment, the device further comprises a weighing device, in particular a belt weigher, for determining the weight of scrap bundles. In this way, the weight of an analysed scrap bundle or group of scrap bundles can be determined. Preferably, the computation device is arranged to determine the composition information also depending on the value for the weight.

In a further embodiment, the device further comprises a sorting device arranged to sort scrap bundles based on the composition information determined for the respective scrap bundle.

In a further embodiment, the device further comprises a feeding point for feeding scrap bundles onto the conveyor system and/or a removal point for removing the scrap bundles from the conveyor system. In this way, the scrap bundles and/or groups of scrap bundles can be placed on or removed from the conveyor system as a whole, for example with a forklift.

In a further embodiment, the area of the measuring device is bounded, for example by a fence. In this case, the feeding point and/or the removal point are preferably arranged outside the boundary, in particular outside the fence.

According to the disclosure, the above-mentioned problem is further solved by using the previously described device or an embodiment thereof for analysing and/or sorting scrap metal, in particular scrap aluminium, wherein the scrap metal to be analysed and/or sorted is preferably present or provided in the form of one or more scrap bundles and/or one or more groups of scrap bundles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
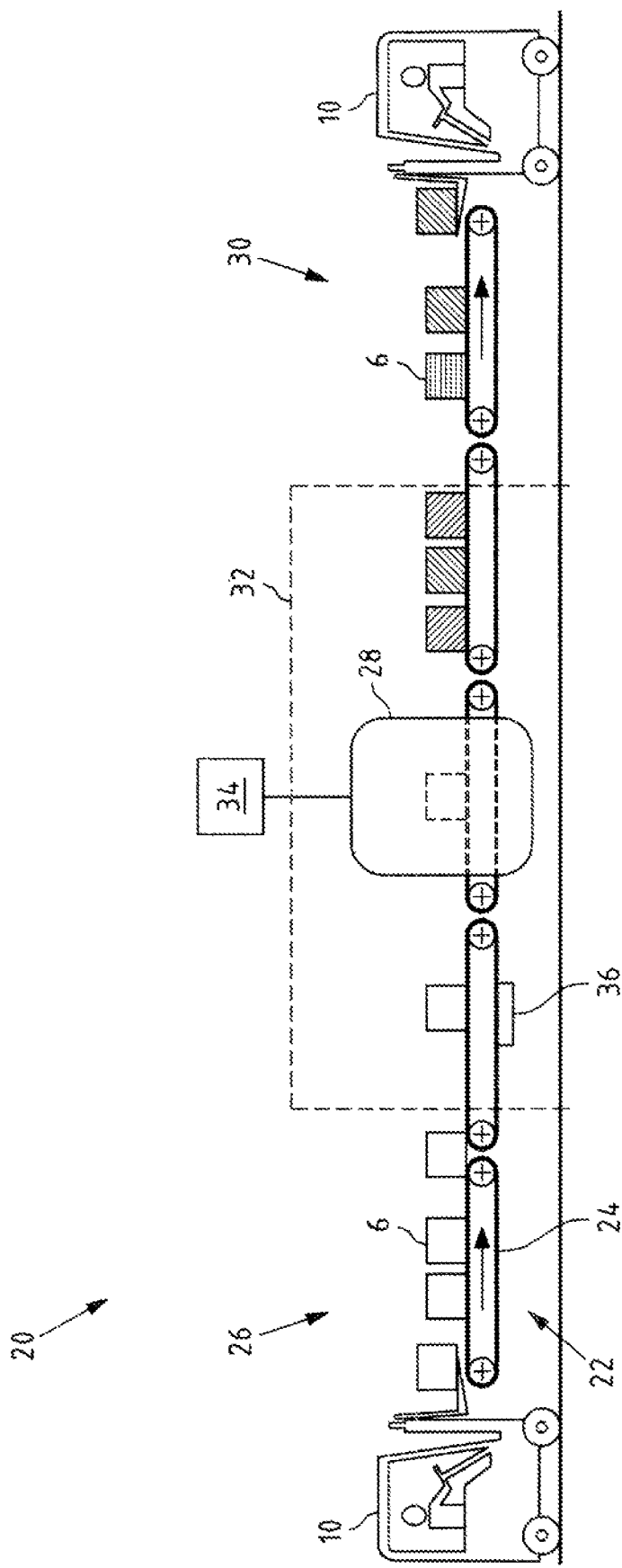
Figure 3:
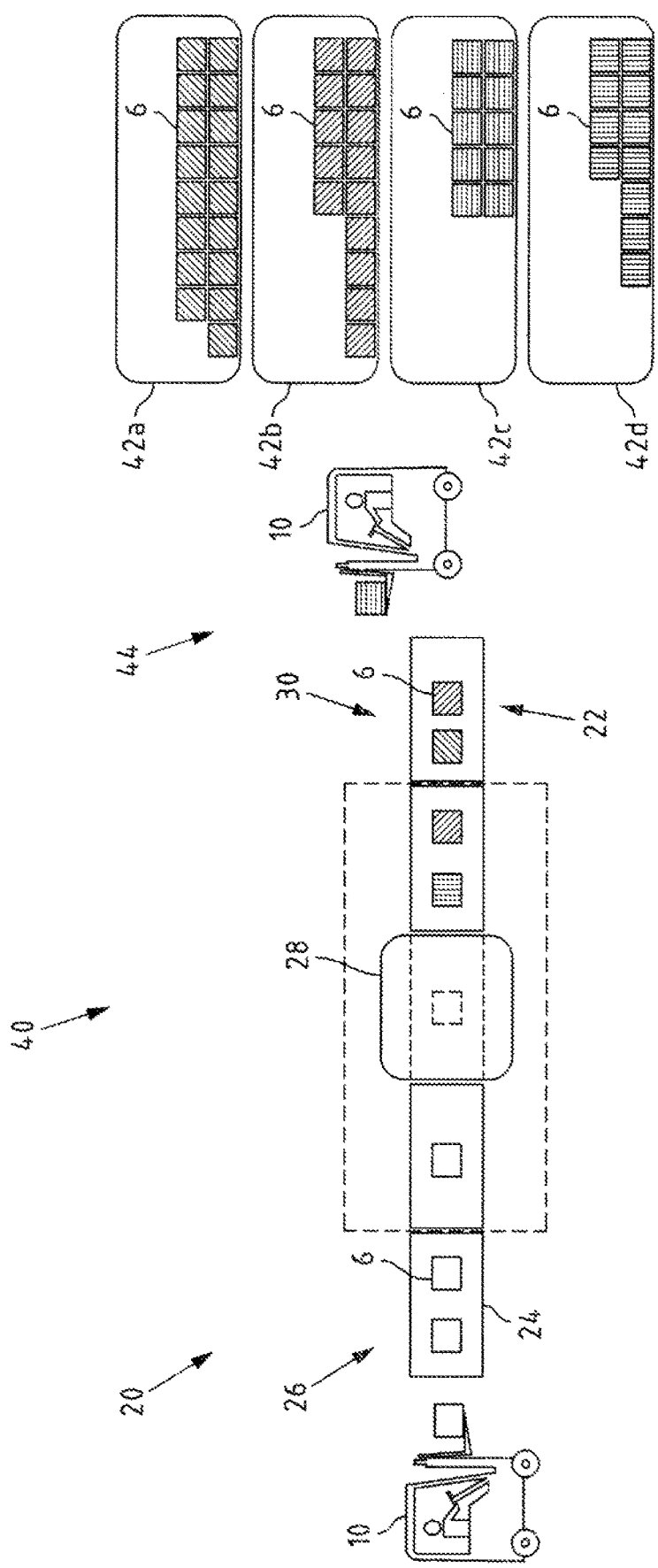

Further advantages and features of the methods and the device will be apparent from the following description of exemplary embodiments with reference to the attached drawing wherein it is shown by:

FIG. 1 a first exemplary embodiment of the methods,
FIG. 2 a further exemplary embodiment of the methods and one exemplary embodiment of the device, and
FIG. 3 further exemplary embodiments of the methods and the device.

Corresponding reference numerals indicate corresponding parts throughout the several views of the drawings.

DETAILED DESCRIPTION

Example embodiments will now be described more fully with reference to the accompanying drawings.

FIG. 1 shows a first exemplary embodiment of the methods. In the method, a quantity of scrap metal 2, in particular scrap aluminium, is provided in the form of a group 4 of scrap bundles 6, and in the present example in the form of a group of scrap bundles 6 stacked on a pallet 8.

The pallet 8 with the stacked scrap bundles 6 is arranged in its entirety in a measuring device 12 for prompt gamma neutron actuation analysis (PGNAA) using a forklift 10. For this purpose, the measuring device 12 has a receptacle 14, the size of which is such that the pallet 8 with the scrap bundles 6 can be arranged in this receptacle 14.

The forklift 10 preferably has a weighing device with which the weight of the scrap bundles 6 stacked on the pallet 8 can be determined.

Instead of arranging the pallet 8 directly in the measuring device 12 by means of the forklift 10, the pallet 8 with the stacked scrap bundles 6 can also be placed in its entirety on a carriage using a forklift 10, which carriage then moves automatically into the measuring device 12 for prompt gamma neutron activation analysis (PGNAA). In this way, persons can be protected from any increased radiation exposure in the area of the measuring device 12.

The PGNAA technique is known in principle and therefore does not need to be explained in detail here. In this context, reference is made, for example, to EP 3 393 687 B1. Likewise, measuring devices for prompt gamma neutron activation analysis (PGNAA) are known in principle, so that they also need not be explained in detail here.

The measuring device 12 comprises a neutron source 13 so that the group 4 of scrap bundles 6 arranged in the measuring device 12 is irradiated with neutrons. The gamma radiation thereby emitted by the group 4 of scrap bundles 6 is captured by at least one detector 15 of the measuring device 12.

The gamma radiation captured by the at least one detector of the measuring device 12 is analysed by a computation device 16, which may also be designed as part of the measuring device 12. The measuring device 12 then computes composition information about the composition of the group 4 of scrap bundles 6 based on the captured gamma radiation. In particular, the measuring device can determine the contents of certain alloying elements, such as for example Al, Si, Fe, Zn, Cu, Mg, Mn, etc.

Since the entire group 4 of scrap bundles 6 has been analysed in its entirety by the measuring device 12, the composition information determined in this way is very reliable for the overall composition of the group 4 of scrap bundles 6 so that the group 4 can be further used in a targeted manner.

FIG. 2 shows a further exemplary embodiment of the methods as well as an exemplary embodiment of the device.

The device 20 comprises a conveyor system 22 with a plurality of conveyor belts 24, by means of which scrap bundles 6 can be transported from a feeding point 26 through the measuring device 28 for prompt gamma neutron activation analysis to a removal point 30. The measuring device 28 comprises a neutron source for irradiating the scrap bundles 6 conveyed on the conveyor system 22, and at least one detector for detecting the gamma radiation emitted by the scrap bundles 6 by this neutron irradiation. The area of the measuring device 28 can be bounded, for example, by a fence 32 in order to protect persons from a possibly increased radiation exposure in the area of the measuring device 28. The measuring device 28 is configured in such a way that scrap bundles can be analysed in their entirety.

The device 20 further comprises a computation device 34 which is arranged to determine respective composition information about the composition of the scrap bundles 6 conveyed on the conveyor system 22 based on the gamma radiation captured by the at least one detector of the measuring device 28. The respective composition information is then preferably assigned to the respective scrap bundles 6 so that the scrap bundles 6 can be further processed, for example sorted and/or melted down, depending on the respective assigned composition information.

In order to assign the composition information to the individual scrap bundles 6, the scrap bundles can in particular be assigned identifiers, for example in accordance with the sequence in which they are transported on the conveyor system 22. The composition information can then be easily assigned to the respective identifiers of the scrap bundles 6.

The device 20 further preferably comprises a weighing device 36, in particular in the form of a belt weigher, which can be used to determine the weight of the individual scrap bundles 6. The computation device 34 can be configured to determine the composition information also depending on the weight of the respective scrap bundle determined by means of the weighing device 35. In this way, instead of or in addition to a content information in wt. %, for example, the total weight for an alloying element in a scrap bundle can also be determined.

FIG. 3 shows further exemplary embodiments of the methods and the device.

The device 40 comprises the device 20 of FIG. 2 and additionally a series of bunkers 42a-d for four predetermined classes each with defined content limits for certain alloying elements (e.g. bunker 42a for AA6xxx content limits, bunker 42b for AA5xxx content limits, bunker 42c for mixtures of AA6xxx and AA5xxx, bunker 42d for AA3xxx content limits).

The individual scrap bundles 6 are assigned a respective composition information as described for FIG. 2. Depending on the respective composition information and a predetermined assignment rule, the scrap bundles 6 are assigned to one of the four predetermined classes and can then be sorted accordingly, in particular by means of a sorting device 44, into the corresponding bunkers 42a-d. In FIG. 3, sorting is carried out using a forklift 10 as an example. An automatic sorting device can also be provided instead.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for analysing and/or sorting scrap aluminium, comprising:
   providing a conveyor system for conveying scrap bundles;
   a measuring device, which has at least one neutron source for irradiating scrap bundles conveyed on the conveyor system, and at least one detector for capturing gamma radiation emitted by the scrap bundles as a result of this neutron irradiation; and
   a computation device which is arranged to determine composition information relating to the composition of one or more scrap bundles conveyed on the conveyor system on the basis of the gamma radiation captured by the at least one detector,
   in which a quantity of scrap metal in the form of a scrap bundle or a group of scrap bundles is provided, a scrap bundle being understood to mean a quantity of scrap fragments which are pressed together to form a bundle,
   in which the scrap bundle or the group of scrap bundles is irradiated by the at least one neutron source,
   in which the gamma radiation emitted by the scrap bundle or by the group of scrap bundles is captured by the at least one detector, and
   in which composition information relating to the composition of the scrap bundle or the group of scrap bundles is determined on the basis of the gamma radiation captured by the at least one detector.

2. The method according to claim 1,
   wherein
   the group of scrap bundles is provided as a loose stack or a pack of scrap bundles.

3. The method according to claim 1,
   wherein
   a value for the weight of the scrap bundle or the group of scrap bundles is determined.

4. The method according to claim 1,
   wherein
   the composition information comprises a value for the content of at least one element.

5. The method according to claim 1,
   wherein
   the composition information is assigned to the scrap bundle or the group of scrap bundles.

6. The method according to claim 1,
   wherein
   the scrap bundle or the group of scrap bundles is assigned to one of several predetermined classes depending on the determined composition information and a predetermined assignment rule.

7. The method according to claim 1,
   wherein
   the scrap bundle or the group of scrap bundles is sorted depending on the determined composition information.

8. The method according to claim 1,
   in which a plurality of scrap bundles and/or a plurality of groups of scrap bundles are provided,
   in which the scrap bundles and/or the groups of scrap bundles are placed on the conveyor system, and
   in which the scrap bundles and/or the groups of scrap bundles are conveyed with the conveyor system successively through the measuring device in which the scrap bundles and/or the groups of scrap bundles are irradiated by the at least one neutron source, wherein the gamma radiation emitted by a respective one of the scrap bundles or by a respective group of scrap bundles is captured by the at least one detector and composition information relating to the composition of the respective scrap bundle or the respective group of scrap bundles is determined on the basis of the captured gamma radiation.

9. A method for analysing and/or sorting scrap aluminium, comprising:

providing a conveyor system for conveying scrap bundles;

a measuring device, which has at least one neutron source for irradiating scrap bundles conveyed on the conveyor system, and at least one detector for capturing gamma radiation emitted by the scrap bundles as a result of this neutron irradiation; and a computation device which is arranged to determine composition information relating to the composition of one or more scrap bundles conveyed on the conveyor system on the basis of the gamma radiation captured by the at least one detector, in which a plurality of scrap bundles and/or a plurality of groups of scrap bundles are provided, a scrap bundle being understood to mean a quantity of scrap fragments which are pressed together to form a bundle, in which the respective composition information for the scrap bundles and/or the groups of scrap bundles is determined in that the respective scrap bundle or the respective group of scrap bundles is irradiated by at least one neutron source, the gamma radiation emitted by the respective scrap bundle or the respective group of scrap bundles is captured by the at least one detector, and composition information relating to the composition of the respective scrap bundle or the group of scrap bundles is determined on the basis of the gamma radiation captured by the at least one detector.

\* \* \* \* \*